United States Patent Office 3,284,504
Patented Nov. 8, 1966

3,284,504
O-ALKYLATION OF HYDROXYARYLAMINES
Robert H. Rosenwald, Western Springs, Ill., assignor to Universal Oil Products Company, Des Plaines, Ill., a corporation of Delaware
No Drawing. Filed July 6, 1965, Ser. No. 469,912
8 Claims. (Cl. 260—571)

This invention relates to the O-alkylation of hydroxyarylamines with an olefin alkylating agent. This invention is a continuation-in-part of my copending application Serial No. 269,712, filed March 1, 1963, now abandoned.

A number of processes for the nuclear alkylation of hydroxyaromatic compounds, whereby an alkyl group is substituted for a hydrogen atom of the aromatic ring, are known to the art. However, it is frequently desirable in the alkylation of compounds of this type to substitute an alkyl group for the hydrogen atom of the hydroxyl group to produce an aromatic ether, the process being referred to as O-alkylation. Aromatic ethers which can be formed in this manner are useful as inhibitors in suppressing the oxidizing tendency of the atmosphere in respect to certain valuable products. In particular, p-isopropoxydiphenylamine has found specific utility as an inhibitor with relation to rubber and petroleum products. For example, when utilized as an additive in the manufacture of rubber tires, p-isopropoxydiphenylamine is outstanding in its ability to suppress the so-called "flex cracking" which is so objectionable to consumers.

It is an object of this invention to present a novel process for the O-alkylation of hydroxyarylamines. It is another object to present a novel process for the preparation of an alkoxydiphenylamine, particularly p-isopropoxydiphenylamine.

In one of its broad aspects the present invention embodies a process for the O-alkylation of a hydroxyarylamine of the general formula $(OH)_m$—Ar—$(NR_2)_n$ wherein (OH) represents a hydroxy radical, Ar represents an aryl radical and $(NR_2)$ represents an amino radical wherein R is selected from the group consisting of hydrogen, lower alkyl and aryl or mono-hydroxyaryl, $m$ is 1 to 2 $n$ being a number from 1 to 3, which process comprises heating said arylamine with an olefin at a temperature of from about 50° C. to about 125° C. in contact with a stoichiometric excess of an inorganic alkylation catalyst with respect to the amino substituents of said arylamine and recovering the resulting alkoxyarylamine.

In a more specific embodiment, this invention relates to the O-alkylation of hydroxydiphenylamine which comprises heating said diphenylamine with an olefin at a temperature of from about 50° C. to about 125° C. in contact with a stoichiometric excess of an inorganic alkylation catalyst and recovering the resulting alkoxydiphenylamine.

One specific embodiment of this invention is in a process for the O-alkylation of p-hydroxydiphenylamine which comprises heating said diphenylamine with propene at a temperature of from about 50° C. to about 100° C. in contact with a stoichiometric excess of sulfuric acid alkylation catalyst and recovering the resulting p-isopropoxydiphenylamine.

Other objects and embodiments of the process of this invention will become apparent in the following detailed specification.

Hydroxylamines which can be treated in accordance with the process of this invention are represented by the general formula $(OH)_m$—Ar—$(NR_2)_n$ wherein (OH) represents a hydroxy radical, Ar represents an aryl radical, preferably phenyl, and $(NR_2)_n$ represents an amino radical wherein R is selected from the group consisting of hydrogen, lower alkyl, and aryl, or mono-hydroxyaryl, $m$ is 1 to 2 $n$ being a number from 1 to 3. Suitable hydroxyarylamines thus include o-aminophenol, m-aminophenol, p-aminophenol, 2,5-diaminophenol, 1-amino-2-naphthol, 1-amino-3-naphthol, 1-amino-4-naphthol, 1-amino-8-naphthol, 1-amino-2-anthranol, 1-amino-3-anthranol, 1-amino-4-anthranol, 1-amino-8-anthranol, 2-amino-9-phenanthrol and also the ortho, meta, and para isomers of hydroxy-N-methylphenylamine, hydroxy-N,N-dimethylphenylamine, hydroxy-N-ethylphenylamine, hydroxy-N,N-diethylphenylamine, hydroxy-N-propylphenylamine, hydroxy-N,N-dipropylphenylamine, hydroxy-N-butylphenylamine, hydroxy-N,N-dibutylphenylamine, and the like, and in particular hydroxydiphenylamines, for example, 2-hydroxydiphenylamine, 3-hydroxydiphenylamine, 4-hydroxydiphenylamine, 2,3 - dihydroxydiphenylamine, 2,4 - dihydroxydiphenylamine, 2,5 - dihydroxydiphenylamine, 2,6 - dihydroxydiphenylamine, 3,4 - dihydroxydiphenylamine, 3,5 - dihydroxydiphenylamine, 2,2′ - dihydroxydiphenylamine, 2,3′- dihydroxydiphenylamine, 2,4′-dihydroxydiphenylamine, 3,3′ - dihydroxydiphenylamine, 3,4′ - dihydroxydiphenylamine, 4,4′ - dihydroxydiphenylamine, and the like.

The olefin alkylating agents which can be utilized are the normally gaseous or normally liquid olefins including ethylene, but preferably olefins containing 3 or more carbon atoms such as mono-olefinic lower alkenes or lower cycloalkenes, for example, propene, butene-1, butene-2, isobutene, 2-methyl-1-butene, 2-methyl-2-butene, pentene-1, pentene-2 and also cycloolefins like cyclobutene, cyclopentene, cyclohexene and cycloheptene.

In accordance with the process of this invention the selected hydroxyarylamine and olefin alkylating agent are heated together in contact with an inorganic alkylation catalyst. Although described and utilized as catalysts, the catalysts of this invention must be used in at least a slight excess of stoichiometric amounts with respect to the amino substituent or substituents of the selected hydroxyarylamine. While certain of the carboxylic acid alkylation catalysts are active in promoting O-alkylation as herein contemplated, it has been found that inorganic acid alkylation catalysts effect a higher product yield at more moderate reaction conditions. Suitable inorganic acid alkylation catalysts include acid-acting catalysts such as the Friedel-Crafts metal halides, for example, aluminum chloride, aluminum bromide, zinc chloride, zirconium chloride, gallium chloride, antimonic chloride, antimonic bromide, bismuth chloride, and also acid-acting refractory metal oxides such as alumina, silica, boria, zirconia, thoria and also composites thereof like silica-alumina, silica-zirconia and silica-alumina-zirconia. Inorganic acid alkylation catalysts, for example, phosphoric acid, sulfuric acid, hydrofluoric acid and particularly sulfuric acid, are preferred.

O-alkylation of hydroxyarylamines with an olefin alkylation agent is suitably effected at a temperature below about 125° C., and usually at a temperature below about 100° C., in contact with the alkylation catalyst herein described. A temperature of at least about 50° C. is preferred. Although it may be desirable to employ superatmospheric pressures, for example, to maintain the reactants in a liquid phase or to facilitate a process flow, pressure is not considered to be an important variable in the present process and may be simply autogenous pressure developed during the course of the reaction.

The process of this invention may be effected in any conventional or otherwise convenient manner and may comprise a batch or a continuous type of operation. In one suitable batch type of operation, a quantity of the selected hydroxyarylamine, olefin, and catalyst, is charged to a reaction vessel which in some cases may be an alkylation flask, although an autoclave capable of containing the reactants at the reaction conditions herein described is generally more suitable. The reaction mixture is heated therein at the desired temperature and for a predetermined residence time, usually a period of time ranging from about 0.1 to about 5 hours. The product can be recovered from the reaction mixture by flashing off, or otherwise evaporating, the volatile matter therefrom, neutralizing the remainder of the reaction mixture, extracting unreacted hydroxyarylamine with caustic solution, and thereafter drying and distilling the product.

The present process can be effected in a continuous manner. For example, the reactants, together with the catalyst, can be continuously charged upflow or downflow through a properly heated reaction zone located within a suitable reactor. Alternatively, in the case of a solid catalyst, the reactants can be continuously charged to a fixed catalyst bed located in the heated reaction zone. In either case, the reactor effluent is continuously withdrawn at a rate which will insure an adequate residence time therein. The present process will function effectively as a oncethrough operation although it may be advantageous to recycle at least a portion of the reactor effluent to the aforesaid reaction zone. The reaction product is recovered by conventional means, for example, neutralization and extraction of unreacted hydroxyarylamine with caustic, water-washing and drying the remainder of the reaction product, and distillation. Any unreacted starting materials are recycled as a portion of the reactor charge.

The following examples are presented in further illustration of the process of this invention. It is not intended that said examples shall serve as an undue limitation on the generally broad scope of this invention as set out in the appended claims.

*Example I*

37 grams of p-hydroxydiphenylamine was admixed with 114 grams of 80% sulfuric acid in an 850 milliliter capacity steel autoclave. 50 grams of propylene was charged thereto and the autoclave sealed. The autoclave contents were heated at about 75° C. over a period of about 5 hours with constant stirring. On termination of the stated period, the autoclave was cooled to room temperature and unreacted propylene flash distilled from the reaction mixture. The reaction mixture was neutralized and unreacted hydroxydiphenylamine extracted with caustic solution. The remainder of the reaction mixture was washed and dried and distilled to yield 16.3 grams of p-isopropoxydiphenylamine.

*Example II*

O-alkylation of p-hydroxydiphenylamine with propylene as the alkylating agent is effected at a temperature of about 75° C. and in the presence of about 85% hydrofluoric acid. 0.2 mole of p-hydroxydiphenylamine is admixed with about 100 grams of 80% hydrofluoric acid in an 850 milliliter capacity steel autoclave and about 1.2 moles of propylene charged thereto. The autoclave contents are sealed therein and stirred at a temperature of about 75° C. over a period of about 2 hours. Thereafter, the autoclave is cooled and unreacted propylene recovered from the reaction mixture by flash distillation. The reaction mixture is neutralized and unreacted p-hydroxydiphenylamine recovered by caustic extraction. The remaining reaction mixture is dried and distilled to yield the p-isopropoxydiphenylamine O-alkylation product.

*Example III*

O-alkylation of p-hydroxydiphenylamine with propylene as the alkylating agent is effected at a temperature of about 75° C. and in the presence of 85% phosphoric acid. 0.2 mole of p-hydroxydiphenylamine is admixed with about 200 grams of 85% phosphoric acid in an 850 milliliter capacity sealed autoclave and about 1.2 moles of propylene charged thereto. The autoclave contents are sealed therein and stirred at a temperature of about 100° C. over a period of about 2 hours. Thereafter the autoclave is cooled and unreacted propylene recovered from the reaction mixture by flash distillation. The reaction mixture is neutralized and unreacted p-hydroxydiphenylamine recovered by caustic extraction. The remaining reaction mixture is dried and distilled to yield the p-isopropoxydiphenylamine O-alkylation product.

*Example IV*

O-alkylation of p-aminophenol with propylene as the alkylating agent is effected by heating about 0.2 mole of p-aminophenol with about 1.2 mole of propylene and about 114 grams of 80% sulfuric acid enclosed in an 850 milliliter rotating steel autoclave. The temperature is maintained at approximately 75° C. and the reaction mixture is continuously stirred for a period of about 2 hours. The reaction mixture is thereafter cooled and unreacted propylene is flash distilled therefrom. The reaction mixture is neutralized, and unreacted aminophenol separated therefrom by caustic extraction. The remainder of the reaction mixture is dried and distilled to recover the p-isopropoxyaniline O-alkylation product.

*Example V*

0.2 mole of p-hydroxydiphenylamine is admixed with 114 grams of 80% sulfuric acid in a steel autoclave. 1.2 moles of butene is charged thereto and the autoclave sealed. The reaction mixture is stirred and heated at a temperature of about 75° C. for a period of about 2 hours. Thereafter, the reaction mixture is cooled and unreacted butene is recovered by flash distillation. The reaction mixture in neutralized and unreacted p-hydroxydiphenylamine extracted with caustic solution. The remaining reaction mixture is washed and dried. The O-alkylation product, p-sec-butoxydiphenylamine, is recovered by distillation methods.

I claim as my invention:

1. A process for the O-alkylation of a hydroxyarylamine of the general formula $(OH)_m$—Ar—$(NR_2)_n$ wherein $m$ is 1 to 2, Ar represents aryl or mono-hydroxyaryl and $(NR_2)$ represents an amino radical wherein R is selected from the group consisting of hydrogen, lower alkyl and aryl, $n$ being a number from 1 to 3, which process comprises heating said arylamine with a mono-olefinic lower alkene or lower cycloalkene at a temperature of from about 50° C. to about 125° C. in contact with a stoichiometric excess of an inorganic alkylation catalyst selected from the group consisting of Friedel-Crafts metal halides, acid-acting metal oxides, phosphoric acid, sulfuric acid and hydrofluoric acid, said excess being with respect to the amino substituents of said arylamine and recovering the resulting alkoxyarylamine.

2. A process for the O-alkylation of hydroxydiphenylamine which comprises heating said diphenylamine with a mono-olefinic lower alkene or lower cycloalkene at a temperature of from about 50° C. to about 125° C. in contact with a stoichiometric excess of an inorganic alkylation catalyst selected from the group consisting of Friedel-Crafts metal halides, acid-acting metal oxides, phosphoric acid, sulfuric acid and hydrofluoric acid, and recovering the resulting alkoxydiphenylamine.

3. A process for the O-alkylation of hydroxydiphenylamine which comprises heating said diphenylamine with a mono-olefinic lower alkene at a temperature of from about 50° C. to about 125° C. in contact with a stoichiometric excess of an inorganic alkylation catalyst selected from the group consisting of Friedel-Crafts metal halides, acid-acting metal oxides, phosphoric acid, sulfuric acid and hydrofluoric acid, and recovering the resulting alkoxydiphenylamine.

4. A process for the O-alkylation of p-hydroxydiphenylamine which comprises heating said diphenylamine with propene at a temperature of from about 50° C. to about 100° C. in contact with a stoichiometric excess of hydroacid alkylation catalyst and recovering the resulting p-isopropoxydiphenylamine.

5. A process for the O-alkylation of p-hydroxydiphenylamine which comprises heating said diphenylamine with propene at a temperature of from about 50° C. to about 100° C. in contact with a stoichiometric excess of hydrofluoric acid alkylation catalyst and recovering the resulting p-isopropoxydiphenylamine.

6. A process for the O-alkylation of p-hydroxydiphenylamine which comprises heating said diphenylamine with propene at a temperature of from about 50° C. to about 100° C. in contact with a stoichiometric excess of phosphoric acid alkylation catalyst and recovering the resulting p-isopropoxydiphenylamine.

7. A process for the O-alkylation of p-aminophenol which comprises heating said hydroxyaniline with propene at a temperature of from about 50° C. to about 100° C. in contact with a stoichiometric excess of sulfuric acid alkylation catalyst and recovering the resulting p-isopropoxyaniline.

8. A process for the O-alkylation of p-hydroxydiphenylamine which comprises heating said diphenylamine with butene at a temperature of from about 50° C. to about 100° C. in contact with a stoichiometric excess of sulfuric acid alkylation catalyst and recovering the resulting p-sec-butoxydiphenylamine.

References Cited by the Examiner
UNITED STATES PATENTS

| | | | |
|---|---|---|---|
| 2,393,156 | 1/1946 | Gibbs | 260—571 |
| 2,655,546 | 10/1953 | Stevens et al. | 260—612 |
| 3,169,941 | 2/1965 | Alt et al. | 260—571 XR |

OTHER REFERENCES

Royals: "Advanced Organic Chemistry," pages 467–8 (1956).

Shostakovski et al.: "Chemical Abstracts," vol. 54, page 8690 (1960).

Zavgorodnii et al.: "Chemical Abstracts," vol. 51, page 15448 (1957).

CHARLES B. PARKER, *Primary Examiner.*

ROBERT V. HINES, *Assistant Examiner.*